(12) United States Patent
Sethi et al.

(10) Patent No.: US 7,416,718 B2
(45) Date of Patent: Aug. 26, 2008

(54) AUTO-OXIDATION PRODUCTION OF HYDROGEN PEROXIDE VIA OXIDATION IN A MICROREACTOR

(75) Inventors: Dalbir S. Sethi, Cranbury, NJ (US); Emmanuel A. Dada, Bensalem, PA (US); Kevin Hammack, League City, TX (US); Xinliang Zhou, Sugar Land, TX (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 11/512,464

(22) Filed: Aug. 30, 2006

(65) Prior Publication Data

US 2007/0053829 A1 Mar. 8, 2007

Related U.S. Application Data

(60) Provisional application No. 60/713,170, filed on Aug. 31, 2005.

(51) Int. Cl.
*C01B 15/022* (2006.01)
*C01B 15/023* (2006.01)

(52) U.S. Cl. ................. 423/587; 423/588; 423/589; 423/590; 423/659

(58) Field of Classification Search ............. 423/588, 423/589, 590, 659, 587
See application file for complete search history.

(56) References Cited

U.S. PATENT DOCUMENTS

| | | | |
|---|---|---|---|
| 2,035,101 A | 3/1936 | Soule | |
| RE20,769 E | 6/1938 | Soule | |
| 2,158,525 A | 5/1939 | Riedl et al. | |
| 2,215,883 A | 9/1940 | Riedl et al. | |
| 2,657,980 A | 11/1953 | Sprauer | |
| 2,862,794 A | 12/1958 | Dufraisse et al. | |
| 2,886,416 A | 5/1959 | Cox et al. | |
| 3,004,831 A | 10/1961 | Hungerford et al. | |
| 3,009,782 A | 11/1961 | Porter | |
| 3,073,680 A | 1/1963 | Jenney et al. | |
| 3,423,176 A | 1/1969 | Kabisch et al. | |
| 3,565,581 A | 2/1971 | Lee | |
| 3,880,596 A | 4/1975 | Liebert et al. | |
| 4,428,922 A | 1/1984 | Hopkins | |
| 4,552,748 A | 11/1985 | Berglin et al. | |
| 5,063,043 A | 11/1991 | Bengtsson | |
| 5,196,179 A | 3/1993 | Turunen | |
| 5,399,333 A * | 3/1995 | Kato et al. | 423/588 |
| 5,534,328 A | 7/1996 | Ashmead et al. | |
| 5,637,286 A | 6/1997 | Turunen | |
| 5,690,763 A | 11/1997 | Ashmead et al. | |
| 5,725,837 A * | 3/1998 | Turunen | 423/588 |
| 6,352,577 B1 | 3/2002 | Martin et al. | |
| 6,375,921 B1 | 4/2002 | Eickhoff et al. | |
| 6,426,057 B1 | 7/2002 | Maurer | |
| 6,533,840 B2 | 3/2003 | Martin et al. | |
| 6,695,044 B1 | 2/2004 | Symonds | |
| 6,736,201 B2 | 5/2004 | Watton et al. | |
| 6,861,042 B2 | 3/2005 | Korl et al. | |
| 6,968,892 B1 | 11/2005 | Symonds | |
| 6,984,363 B2 | 1/2006 | Tonkovich et al. | |
| 6,988,535 B2 | 1/2006 | Upadhya et al. | |
| 6,994,829 B2 | 2/2006 | Whyatt et al. | |
| 7,029,647 B2 | 4/2006 | Tonkovich et al. | |
| 2002/0141935 A1 | 10/2002 | Haas et al. | |
| 2003/0152488 A1 | 8/2003 | Tonkovich et al. | |
| 2003/0180216 A1 * | 9/2003 | TeGrotenhuis et al. | 423/659 |
| 2003/0219903 A1 | 11/2003 | Wang et al. | |
| 2004/0228781 A1 | 11/2004 | Tonkovich et al. | |
| 2005/0133457 A1 | 6/2005 | Tonkovich et al. | |
| 2005/0244304 A1 | 11/2005 | Tonkovich et al. | |
| 2005/0265915 A1 | 12/2005 | Tonkovich et al. | |
| 2006/0046113 A1 | 3/2006 | Wang et al. | |
| 2006/0073080 A1 | 4/2006 | Tonkovich et al. | |
| 2006/0102519 A1 | 5/2006 | Tonkovich et al. | |
| 2006/0147370 A1 * | 7/2006 | Mathias et al. | 423/650 |

FOREIGN PATENT DOCUMENTS

| | | |
|---|---|---|
| EP | 0384905 A1 | 8/1990 |
| GB | 718307 A | 11/1954 |
| WO | 93-02960 A1 | 2/1993 |
| WO | 02-42704 A1 | 5/2002 |

OTHER PUBLICATIONS

Schumb et al, Hydrogen Peroxide, Reinhold Publishing, NY, 1955, pp. 77-82.
Kirk-Othmer Encyclopedia of Science & Technology, Hydrogen Peroxide, Wiley, NY, 3rd ed, vol. 13, pp. 15 22-23 33.
Ehrfeld et al, Microreactors, Wiley-VCH, Weinheim (Germany), 2003, pp. vi-xi, 1-12 229-243 255-256 277.
Ulmann's Encyclopedia of Industrial Chemistry, Hydrogen Peroxide, VCH, 5th ed, 1989, vol. A13 1991 pp. 443-444 457 464-465.

* cited by examiner

*Primary Examiner*—Wayne Langel

(57) ABSTRACT

Hydrogen peroxide is prepared by an auto-oxidation method via oxidation in a microreactor. A working solution containing a reactive carrier compound is hydrogenated with hydrogen in a first step and is subsequently oxidized in a microreactor to produce hydrogen peroxide.

22 Claims, No Drawings

AUTO-OXIDATION PRODUCTION OF HYDROGEN PEROXIDE VIA OXIDATION IN A MICROREACTOR

This application claims the benefit of U.S. Provisional Application No. 60/713,170, filed Aug. 31, 2005.

FIELD OF THE INVENTION

The present invention relates to an improved method for producing hydrogen peroxide. More particularly, the invention relates to a hydrogen peroxide method in which a microreactor is employed in the oxidation step of an auto-oxidation process.

BACKGROUND OF THE INVENTION

Hydrogen peroxide ($H_2O_2$) is a versatile commodity chemical with diverse applications. Hydrogen peroxide applications take advantage of its strong oxidizing agent properties and include pulp/paper bleaching, waste water treatment, chemical synthesis, textile bleaching, metals processing, microelectronics production, food packaging, health care and cosmetics applications. The annual U.S. production of $H_2O_2$ is 1.7 billion pounds, which represents roughly 30% of the total world output of 5.9 billion pounds per year. The worldwide market for hydrogen peroxide is expected to grow steadily at about 3% annually.

Various chemical processes may be employed to manufacture hydrogen peroxide on a commercial scale. One major class of hydrogen peroxide manufacture comprises the auto-oxidation (AO) of a "working compound" or "working reactant" or "reactive compound", to yield hydrogen peroxide. Commercial AO manufacture of hydrogen peroxide has utilized working compounds in both cyclic and non-cyclic processes.

The cyclic AO processes typically involve hydrogenation (reduction) of a working compound and then auto-oxidation of the hydrogenated working compound to produce hydrogen peroxide. Most current large-scale hydrogen peroxide manufacturing processes are based on an anthraquinone AO process, in which hydrogen peroxide is formed by a cyclic reduction and subsequent auto-oxidation of anthraquinone derivatives. The anthraquinone auto-oxidation process for the manufacture of hydrogen peroxide is well known, being disclosed in the 1930s by Riedl and Pfleiderer, e.g., in U.S. Pat. No. 2,158,525 and No. 2,215,883, and is described in the Kirk-Othmer *Encyclopedia of Chemical Technology*, 3rd. ed., Volume 13, Wiley, N.Y., 1981, pp. 15-22.

In addition to the anthraquinones, examples of other working compounds feasible for use in the cyclic auto-oxidation manufacture of hydrogen peroxide include azobenzene and phenazine; see, e.g., Kirk-Othmer *Encyclopedia of Chemical Technology*, 3rd. ed., Volume 13, Wiley, N.Y., 1981, pp. 15 & 22.

In commercial AO hydrogen peroxide processes, the anthraquinone derivatives (i.e., the working compounds) are usually alkyl anthraquinones and/or alkyl tetrahydroanthraquinones, and these are used as the working compound(s) in a solvent-containing working solution. The anthraquinone derivatives are dissolved in an inert solvent system. This mixture of working compounds and solvent(s) is called the working solution and is the cycling fluid of the AO process. The solvent components are normally selected based on their ability to dissolve anthraquinones and anthrahydroquinones, but other important solvent criteria are low vapor pressure, relatively high flash point, low water solubility and favorable water extraction characteristics.

Non-cyclic AO hydrogen peroxide processes typically involve the auto-oxidation of a working compound, without an initial reduction of hydrogenation step, as in the auto-oxidation of isopropanol or other primary or secondary alcohol to an aldehyde or ketone, to yield hydrogen peroxide.

Hydrogenation (reduction) of the anthraquinone-containing working solution is carried out by contact of the latter with a hydrogen-containing gas in the presence of a catalyst in a large scale reactor at suitable conditions of temperature and pressure to produce anthrahydroquinones.

Once the hydrogenation reaction has reached the desired degree of completion, the hydrogenated working solution is removed from the hydrogenation reactor and is then oxidized by contact with an oxygen-containing gas, usually air. The oxidation step converts the anthrahydroquinones back to anthraquinones and simultaneously forms $H_2O_2$ which normally remains dissolved in the working solution.

The remaining steps in conventional auto-oxidation processes are physical operations. The $H_2O_2$ produced in the working solution during the oxidation step is separated from the working solution in a water extraction step. The $H_2O_2$ leaving the extraction step is typically purified and concentrated.

The working solution from which $H_2O_2$ has been extracted is returned to the reduction step. Thus, the hydrogenation-oxidation-extraction cycle is carried out in a continuous loop, i.e., as a cyclic operation.

An overview of the anthraquinone AO process for the production of hydrogen peroxide is given in Ullman's *Encyclopedia of Industrial Chemistry*, $5^{th}$ Edition, Volume A13, pages 447-456.

The oxidation step is critical to the economics of the auto-oxidation hydrogen peroxide process. Typical oxidizer vessels contain a large inventory of working solution. This costly inventory of working solution represents a high working capital cost in addition to the capital cost of such large vessels. Furthermore, the large working solution inventory in conventional oxidizer vessels inherently presents a higher fire risk in the operating plant.

Another drawback of the large reactor inventory is its high reactor residence time, which can lead to unwanted by product formation, such as epoxides, and can result in higher decomposition rates of hydrogen peroxide. Conversion of such byproducts back into useful reactants capable of producing hydrogen peroxide necessitates costly side stream unit operations. Of course, the rate of generation of these parasitic byproducts has a strong influence on the sustained capacity and operating costs of a conventional AO process.

One technical objective of anthraquinone based oxidizers is to maximize reactor volumetric productivity. Another objective is to maximize oxidation reaction conversion of the anthrahydroquinone to produce the desired product, hydrogen peroxide. In addition, formation of byproduct compounds such as epoxides should be minimized. The typical oxidation step requires more electricity (when employing typical motor-driven compression for the oxidizing agent stream) than any other unit operation in the anthraquinone hydrogen peroxide process, so minimization of energy requirements is another objective.

Commercial oxidation reactions are most often carried out in a bubble column or modified bubble column reactor. These column reactors may employ some type of internal packing or plates or, alternatively, may be empty. Bubble column reactors achieve good gas/liquid mixing and maintain a well-mixed liquid phase. Modified bubble reactors are those bubble column reactors employing internal devices such as packing or static mixers or, alternatively, employing flow arrangements that deviate from a single liquid and single gas bottom inlet with corresponding co-current upward flow. Pure oxygen, enriched oxygen, and preferably air are used as the oxidizing agent.

A counter-current anthraquinone oxidation column is described in U.S. Pat. No. 2,902,347, which calls for packed columns to minimize the working solution residence time, to minimize and possibly avoid by-product formation. This column type suffers from the disadvantage of requiring a plurality of series-connected columns to achieve reasonably complete conversion, since oxidizing gas feed rate must be kept relatively low to prevent flooding.

A combination of co-current and counter-current oxidation column configurations, to provide improved mixing, is disclosed in U.S. Pat. No. 3,880,596. The oxidation column of the '596 patent, also described in *Chem. Process Eng.*, Vol. 40 (1959), No. 1, p. 5, utilizes internals such as baffles or packing inside the column, to route working solution and oxidizing gas co-currently through individual sections but counter-currently overall. Drawbacks of these columns are the considerable pressure drop associated with the internal devices and the internal reactor space taken up by these internal devices, requiring large reactor vessels to effect substantially complete oxidation conversion. The reported volumetric productivity for the column oxidation reactor describe in the '596 patent is 15.0 kg $H_2O_2/m^3$-hr, using air as the oxidizing agent.

EP-A-221 931 describes an oxidation step in a column with no internal fittings, to avoid the column pressure drops associated with the above-noted columns. The oxidizing gas and working solution are mixed in a nozzle before introduction into the empty column. The gas-liquid mixture produces a coalescence-inhibited stable dispersion in which the gas bubbles retain their initial size despite the absence of internal flow devices. A disadvantage of this oxidation reactor design is that the aerated volume is quite large, reducing the volumetric productivity. The reported volumetric productivity is 22 kg $H_2O_2/m^3$-hr using air as the oxidizing agent.

To improve volumetric reactor productivity over that of the oxidizer reactors mentioned above, U.S. Pat. No. 5,196,179 discloses a tubular reactor with inserted static mixing devices. The working solution and an oxygen-containing mixture flow co-currently in a homogeneous dispersion. The reported volumetric productivity is 254 kg $H_2O_2/m^3$-hr when utilizing pure oxygen gas.

U.S. Pat. No. 6,375,921 describes a counter-current bubble column oxidizer that employs perforated trays. The trays preferably contain complex tapered holes with a round, triangular, semi-elliptical, or slit-shaped construction. The reported volumetric productivity for the '921 patent column oxidizer is 36.0 kg $H_2O_2/m^3$-hr using air as the oxidizing agent.

External mixing devises such as venturi nozzles can be employed to enhance the gas-liquid mixing. U.S. Pat. No. 6,426,057 discloses an approach in which a split stream of preoxidized working solution and hydrogenated working solution are mixed with the oxidizing gas in a venturi nozzle before introduction into an empty bubble column reactor.

Oxidation catalysts such as secondary amines (U.S. Published Patent Application No. 2002/0141935) can be added to conventional anthraquinone oxidizers to accelerate the rate of oxidation. The patent application discloses oxidation reactions in a laboratory reactor that proceed 3.4, 14.2, and 9.0 times faster (than a catalyst-free system using air) when adding 1000 ppm di-n-octylamine, 10% di-n-octylamine, and 1000 ppm di-n-butylamine, respectively.

Conventional AO process oxidation reactors have two significant disadvantages-large reactor volumes and correspondingly long liquid residence times. These characteristics lead to additional disadvantages: large equipment, high equipment and construction costs, large plant footprint, high working capital costs, large fire loads associated with large reactor volumes, and unwanted by-product formation and hydrogen peroxide decomposition associated with the longer liquid residence times.

A very different approach for avoiding some of the drawbacks associated with hydrogenation and oxidation reactions in conventional AO processes is the direct synthesis of hydrogen peroxide from reaction of hydrogen and oxygen, which eliminates the separate hydrogenation and oxidation steps. One such direct synthesis process is described in U.S. Pat. No. 7,029,647, in which the staged reaction of the hydrogen and oxygen reactants is carried out in a microchannel reactor.

It is a principal object of this invention to provide an improved process for the oxidation stage of a conventional AO process for producing hydrogen peroxide with high volumetric reactor productivity, minimum by-product formation and hydrogen peroxide loss through decomposition, high oxidizing gas utilization, and high-grade waste heat of reaction. Another object of this invention is to employ reduced reactant inventories over the conventional AO oxidation reactors.

The present invention achieves these and other objectives in the auto-oxidation production of hydrogen peroxide, using an oxidation stage carried out in a microreactor.

SUMMARY OF THE INVENTION

In accordance with the present invention, hydrogen peroxide is produced by the method of effecting oxidation of a working compound in a microreactor to produce hydrogen peroxide and recovering the hydrogen peroxide. The oxidation microreactor preferably contains one or more microchannels, in which the oxidation is carried out, with the microchannel having at least one cross sectional dimension within the range of from 1 micron to 5 mm, more preferably, from 5 microns to 1 mm.

A preferred embodiment of the invention is a cyclic method for the production of hydrogen peroxide by the steps of catalytically hydrogenating a working compound to yield a hydrogenated working compound; oxidizing the hydrogenated working compound in an oxidation microreactor, to produce hydrogen peroxide; separating the resulting hydrogen peroxide from the oxidized working compound and recovering the hydrogen peroxide in an aqueous solution; and recycling the oxidized working compound to the hydrogenation step.

Another preferred embodiment of the invention is a cyclic method for the production of hydrogen peroxide by the steps of catalytically hydrogenating an anthraquinone working solution, comprising an anthraquinone derivative carried in an organic solvent, to yield an a hydrogenated working solution; oxidizing the hydrogenated working solution in an oxidation microreactor, to produce hydrogen peroxide; separating the hydrogen peroxide from the working solution via aqueous extraction and recovering an aqueous solution of hydrogen peroxide; and recycling the working solution to the hydrogenation step.

DESCRIPTION OF THE PREFERRED EMBODIMENTS

The present invention is directed to an oxidation process step carried out in a microreactor, in the auto-oxidation production of hydrogen peroxide. The oxidation microreactor possesses a high surface-to-volume ratio and exhibits enhanced mass transfer and heat transfer rates, all of which provide unexpected efficiencies and advantages to the overall hydrogen peroxide process.

The invention is particularly adapted to the cyclic auto-oxidation production of hydrogen peroxide, in which a suitable organic working compound is catalytically hydrogenated in a microreactor. The hydrogenated working solution withdrawn from the microreactor is thereafter oxidized to yield hydrogen peroxide. The hydrogen peroxide product is recovered from the working solution, preferably by water extraction, and the regenerated working solution is recycled to the hydrogenation step.

The oxidation method of this invention, utilizing a microreactor, can be employed with working compounds conventionally used for large-scale hydrogen peroxide production in known auto-oxidation (AO) processes. The oxidation microreactor is suitable for oxidizing hydrogenated alkyl anthrahydroquinones and/or alkyl hydroanthrahydroquinones to their corresponding alkyl anthraquinones and/or alkyl hydroanthraquinones. The present invention is directed to an oxidation process step carried out in a microreactor, in the auto-oxidation production of hydrogen peroxide. The oxidation microreactor possesses a high surface-to-volume ratio and exhibits enhanced mass transfer and heat transfer rates, all of which provide unexpected efficiencies and advantages to the overall hydrogen peroxide process.

The invention is particularly adapted to the cyclic auto-oxidation production of hydrogen peroxide, in which a suitable organic working compound is catalytically hydrogenated and thereafter oxidized in a microreactor, to yield hydrogen peroxide. The hydrogen peroxide product is recovered from the working solution, preferably by water extraction, and the regenerated working solution is recycled to the hydrogenation step.

The oxidation method of this invention, utilizing a microreactor, can be employed with working compounds conventionally used in large-scale hydrogenation reactions in known auto-oxidation (AO) processes. The hydrogenation microreactor is suitable for oxidizing alkyl anthrahydroquinones and/or alkyl hydroanthrahydroquinones to their corresponding alkyl anthraquinones and/or alkyl hydroanthraquinones, yielding hydrogen peroxide as the desired product.

Advantages of the Invention

The present invention, utilizing an oxidation step carried out in a microreactor, is noteworthy in that it provides higher volumetric oxidation reactor productivity than conventional AO oxidation reactors. It is believed that the small channel dimensions in a microreactor permit very high surface-to-volume ratios, greatly enhancing mass transfer due to rapid diffusive mixing at the molecular scale and due to very short diffusion paths.

The oxidation microreactor of the present invention provides very high volumetric reactor productivity and is significantly improved over conventional auto-oxidation oxidation reactors. As a result, oxidation operating conditions such as temperature, pressure, flow rates and the like can be optimized even further to obtain high oxidation and working compound regeneration efficiencies, with excellent hydrogen peroxide product yields, since reduced byproduct formation and hydrogen peroxide decomposition losses are reduced, compared with operating in a similar manner in conventional large scale auto-oxidation processes. The present invention has broad application to conventional hydrogen peroxide systems in that it is not dependent on use of a limited number of hydrogenated working solution compositions or on specific or narrowly-defined oxidation temperature or pressure ranges.

The microreactor oxidation of this invention results in minimal parasitic byproduct formation and hydrogen peroxide loss during the oxidation reaction. The intense diffusive mixing in the oxidation microreactor provides good contact between the two reacting phases, and the very short reactant residence time inside the reactor minimizes parasitic byproduct formation and product loss associated with hydrogen peroxide decomposition. Furthermore, the improved mixing and very short residence time allow for much higher temperature operation with minimal sacrifice from undesirable byproduct formation and hydrogen peroxide loss and maximized reaction rate enhancement. This optimized oxidation reaction rate, in turn, enhances the physical absorption of the oxidizing gas into the liquid working solution.

Another advantage of the method of this invention is that the reactant oxygen in the oxidizing gas can be used to near extinction in the oxidation reaction. The oxygen utilization per pass is advantageously maintained at near 100%. This minimizes the size and operating cost of downstream solvent recovery and emissions reduction units associated with the reactor outlet gas stream if air is used as the oxidizing gas in the invention. Alternatively, these same downstream unit operations may be eliminated if pure oxygen is the oxidizing gas used in the invention.

Another advantage of the invention is the capability of removing the heat of reaction throughout the duration of the oxidation reaction, permitting near isothermal operation despite use of a plug-flow style reactor. Isothermal operation affords precise reaction control that enhances reaction selectivity, minimizes hydrogen peroxide loss, and allows for optimum conversion.

Oxidation in a microreactor permits precise temperature control, so much higher operating temperatures can be employed with minimal byproduct formation and hydrogen peroxide loss. The high temperature reaction conditions made possible in the oxidation microreactor of this invention permit the waste heat, generated by the exothermic heat of reaction, to be reused in other unit operations of a conventional AO process such as distillation. By contrast, the oxidation heat of reaction in conventional auto-oxidation hydrogen peroxide process reactions typically is lost to the atmosphere via utility cooling systems.

The oxidation microreactor of this invention is inherently much safer than a conventional auto-oxidation oxidizer reactor, owing to the very small reactant inventory and short path lengths of the microreactor. The enhanced productivity and smaller reactor scale afforded by this invention minimize the likelihood and consequent severity of a working solution/hydrogen peroxide fire. Another advantage of the smaller scale and greater efficiency of the oxidation microreactor is that the inventory of expensive working solution in the reactor is minimized.

The microreactor oxidation of this invention preserves the advantages of conventional auto-oxidation processes. The oxidation operation of this invention, carried out using a microreactor, is not dependent on a specific composition for the working solution and/or on narrowly defined oxidation operating temperatures or pressures.

The hydrogen peroxide auto-oxidation method of the present invention, with an oxidation step carried out using a microreactor, is distinct from other hydrogen peroxide processes that produce hydrogen peroxide directly from hydrogen and oxygen, in a single step. The present invention, as is evident from the description in the present specification, does not encompass such direct methods for the single step synthesis of hydrogen peroxide.

The oxidation method of the present invention has the advantage providing a means for effecting significant economic and process efficiencies in existing hydrogen peroxide production technologies, since the method of the present invention may readily be incorporated or adapted into large-volume commercial production plants, as well as enabling the economic production of smaller hydrogen peroxide volumes, e.g., using existing anthraquinone technology.

Oxidation Microreactor

The oxidation microreactor of this invention is characterized by having one or more microchannels that provide a flow path for the working compound (typically in a working solution) that is oxidized with oxygen within the microreactor.

Suitable microreactors employ single or, preferably, multiple flow paths, i.e., microchannels, with at least one dimension limited to from 1 to 2,000 microns. The microchannels are normally longitudinal in arrangement; a microreactor may contain one or multiple microchannels, as many as 10,000 microchannels. The microchannels may be linked, e.g., in series or in parallel or in other configurations or combinations.

The microreactor contains at least one inlet, as an entrance for the joint or separate introduction of the working compound and oxidation agent into the microreactor microchannels, and at least one exit, for withdrawal of the oxidized working compound and hydrogen peroxide product. The microchannel configurations, e.g., multiple parallel microchannels within the microreactor, can be linked to one or more entrances and/or exits via manifold or header channels. The oxidizing agent may be introduced into the oxidation microreactor in admixture with the introduced working compound or separately, via a separate inlet that connects directly or indirectly with one or microchannels carrying the introduced working compound.

In addition, the microchannel reactor may contain other microchannel process control aspects besides entrance(s) and exit(s), such as valves, mixing means, separation means, flow re-redirection conduit lines, that are in or a part of the microchannel system. The microreactor may also contain heat exchange and heat flux control means, such as heat exchange conduits, chambers or microchannels, for the controlled removal or introduction of heat to or from the solution or fluid flowing through the microchannel network. The microreactor may also contain process control elements, such as pressure, temperature and flow sensors or control elements.

The microchannel cross section may be any of a variety of geometric configurations or shapes. The microchannel cross section may be rectangular, square, trapezoidal, circular, semi-circular, ellipsoidal, triangular, or the like. In addition, the microchannel may contain wall extensions or inserts that modify the cross-sectional shape, e.g., fins, etc. The shape and/or size of the microchannel cross section may vary over its length. For example, the height or width may taper from a relatively large dimension to a relatively small dimension, or vice versa, over a portion or all of the length of the microchannel.

The oxidation microreactor may employ single or, preferably multiple, flow path microchannels with at least one cross sectional dimension within the range of from 1 micron to 5 mm, preferably 5 microns to 2 mm, and most preferably 5 microns to 1 mm. Preferably, the diameter or largest cross sectional microchannel dimension (height or width or other analogous dimension in the case of non-circular cross-sectioned microchannels) is not larger than 2000 microns and, more preferably, is within the range of 10 to 500 microns.

It should be recognized that the microchannel network may have microchannels whose dimensions vary within these ranges and that these preferred dimensions are applicable to the sections of the microreactor where the oxidation reaction is carried out.

Fluid flow through the microchannels is generally in a longitudinal direction, approximately perpendicular to the cross-sectional microchannel dimensions referred to above. The longitudinal dimension for the microchannel is typically within the range of about 3 cm to about 10 meters, preferably about 5 cm to about 5 meters, and more preferably about 10 cm to about 3 meters in length.

The selection of microchannel dimensions and overall length is normally based on the residence time desired for the working solution in the oxidation microreactor, contact time between the multiphase components, and on the oxidation reaction time desired for the working compound (in the working solution). The microchannels in the microreactor may also include inert packing, e.g., glass beads, to improve the mass transfer between the gas phase component(s), e.g., air or oxygen, and liquid phase component(s), e.g., working compound, introduced into the microreactor.

Operating conditions, e.g., temperature and pressure, within the oxidation microreactor are generally within the ranges normally established for large-scale oxidation reactions carried out in AO hydrogen peroxide methods. The enhanced process efficiencies, and improved mass and heat transfer achievable with the method of the present invention permit higher than usual operating temperatures and lower than usual operating pressures to be used without compromise in the overall process efficiency.

Oxidation operating temperatures in the microreactor process of this invention may be within the range of about 20° C. to about 100° C., preferably within the range of about 30° C. to about 90° C. Excellent temperature control is achieved in the oxidation microreactor of this invention, and near isothermal operation is feasible. Such temperature control is normally achieved via heat exchange channels (which may be microchannels) located adjacent to the microreactor microchannels, through which heat exchange channels a heat exchange fluid is flowed.

Operating pressures for the oxidation microreactor, generally measured as the exit pressure, are typically in the low to moderate range, high pressure operation being unnecessary and not warranted from an economics standpoint. Operating pressures are normally less than about 500 psig and preferably less than about 300 psig. Operating pressures below about 150 psig are also feasible and preferred, e.g., with operating outlet pressures within the range of about 50 psig to about 130 psig giving good results.

The hydrogenated working compound is reacted (oxidized) with oxygen gas (or other $O_2$-containing source) in the oxidation reactor, and equimolar amounts of each are required for stoichiometric oxidation of the hydrogenated working compound, in the case of anthraquinone derivatives. Consequently, the two reactants are preferably introduced into the microreactor in approximately equimolar amounts. However, the actual reactant ratios can be varied widely on either side of equimolar amounts, e.g., the molar ratio of $O_2$ to hydrogenated anthraquinone working compound could range from about 0.5:1 to about 5:1, more preferably being within the range of about 0.8:1 to about 2:1. The oxygen gas reactant is preferably introduced as relatively pure $O_2$, to promote overall efficiency of the oxidation reaction in the microreactor, but gas mixtures containing a major proportion of $O_2$ are also feasible for use in the process of this invention.

The oxidation microreactor can be fabricated or constructed from a variety of materials, using any of many known techniques adapted for working with such materials. The oxidation microreactor may be fabricated from any material that provides the strength, dimensional stability, inertness and heat transfer characteristics that permit oxidation of the working compound to be carried out as described in this specification. Such materials may include metals, e.g., aluminum, steel (e.g., stainless steel, carbon steel, and the like), monel, inconel, titanium, nickel, platinum, rhodium, copper, chromium, brass, and their alloys; polymers (e.g., thermoset resins and other plastics) and polymer composites (e.g., thermoset resins and fiberglass); ceramics; glass; fiberglass; quartz; silicon; graphite; or combinations of these.

The oxidation microreactor may be fabricated using known techniques including wire electrodischarge machining, conventional machining, laser cutting, photochemical machining, electrochemical machining, molding, casting, water jet, stamping, etching (e.g., chemical, photochemical or plasma etching) and combinations thereof. Fabrication techniques used for construction of the microreactor are not limited to any specific methods, but can take advantage of construction techniques known to be useful for construction of a device containing small dimension internal channels or passageways, i. e., microchannels. For example, microelectronics technology applicable for creation of microelectronic circuit pathways is applicable where silicon or similar materials are used for construction of the microreactor. Metal sheet embossing, etching, stamping or similar technology is also useful for fabrication of a microreactor from metallic or nonmetallic sheet stock, e.g., aluminum or stainless steel sheet stock. Casting technology is likewise feasible for forming the component elements of a microreactor.

The microreactor may be constructed from individual elements that are assembled to form the desired microreactor configuration with an internal individual microchannel or interconnected microchannel network. The microreactor may be fabricated by forming layers or sheets with portions removed that create microchannels in the finished integral microreactor that allow flow passage to effect the desired oxidation of the working compound. A stack of such sheets may be assembled via diffusion bonding, laser welding, diffusion brazing, and similar methods to form an integrated microreactor device. Stacks of sheets may be clamped together with or without gaskets to form an integral microreactor device. The microreactor may be assembled from individual micromachined sheets, containing microchannels, stacked one on top of another in parallel or perpendicular to one another to achieve the microreactor microchannel configuration desired to achieve the sought-after production capacity. Individual plates or sheets comprising the stack may contain as few as 1, 2 or 5 microchannels to as many as 10,000.

Preferred microreactor structures employ a sandwich-like arrangement containing a multiple number of layers, e.g., plates or sheets, in which the microchannel-containing various layers can function in the same or different unit operations. The unit operation of the layers can vary from reaction, to heat exchange, to mixing, to separation or the like.

The disclosures of U.S. Pat. No. 7,029,647 of Tonkovich et al. that relate to microchannel devices are hereby incorporated by reference into the present specification, as examples of microchannel devices that could be adapted for use in the oxidation method of the present invention. The disclosures of U.S. Pat. No. 6,968,892 of Symonds, of U.S. Pat. No. 6,736,201 of Watton et al. and of U.S. Pat. No. 6,695,044 of Symonds are hereby incorporated by reference into the present specification, for their descriptions of reactors and heat exchanger devices that could be fabricated with microchannels to create a microreactor device that could be adapted for use in the oxidation method of the present invention.

Anthraquinone Derivative—Working Compound & Working Solution

The hydrogen peroxide method of this invention may employ any of various known "working compounds" (i.e., "reactive compounds") and "working solutions" containing such working compounds, useful in the preparation of hydrogen peroxide via hydrogenation and subsequent oxidation of the working compound.

The working compound is preferably an anthraquinone derivative. The anthraquinone derivative used as the working compound in the method of this invention is not critical and any of the known prior art anthraquinone derivatives may be used. Alkyl anthraquinone derivatives and alkyl hydroanthraquinone derivatives are preferred.

It should be understood that, in the discussions about anthraquinone derivatives that follow, the descriptions refer to the quinone form, and that the working compound is in a hydrogenated form, i.e., the hydroquinone form, when introduced into the oxidation step in the microreactor. Oxidation of the hydroquinone form of the working compound with oxygen produces hydrogen peroxide, during the regeneration of the hydrogenated working compound back to its quinone form.

Alkyl anthraquinone derivatives suitable for use as the working compound in this invention include alkyl anthraquinones substituted in position 1, 2, 3, 6 or 7 and their corresponding alkyl hydroanthraquinones, wherein the alkyl group is linear or branched and preferably has from 1 to 8 carbon atoms. The alky group is preferably located on a position that is not immediately adjacent to the quinone ring, i.e., the 2-, 3-, 6-, or 7-position.

The method of the present invention is applicable, but not limited to, the following anthraquinone derivatives: 2-amylanthraquinone, 2-methylanthraquinone, 2-ethylanthraquinone, 2-propyl- and 2-isopropylanthraquinones, 2-butyl-, 2-sec.butyl-, 2-tert.butyl-, 2-isobuytl-anthraquinones, 2-sec.amyl- and 2-tert. amylanthraquinones, 1,3-diethyl anthraquinone, 1,3-, 2,3-, 1,4-, and 2,7-dimethylanthraquinone, 1,4-dimethyl anthraquinone, 2,7-dimehtyl anthraquinone, 2 pentyl-, 2-isoamyanthraquinone, 2-(4-methyl-3-pentenyl) and 2-(4-methylpentyl) anthraquinone, 2-sec.amyl- and 2 tert.amyl-anthraquinones, or combinations of the above mentioned anthraquinones, as well as their corresponding hydroanthraquinone derivatives.

The anthraquinone derivative employed as the working compound is preferably chosen from 2-alkyl-9,10-anthraquinones in which the alkyl substituent contains from 1 to 5 carbon atoms, such as methyl, ethyl, sec-butyl, tert-butyl, tert-amyl and isoamyl radicals, and the corresponding 5,6,7,8-tetrahydro derivatives, or from 9,10-dialkylanthraquinones in which the alkyl substituents, which are identical or different, contain from 1 to 5 carbon atoms, such as methyl, ethyl and tert-butyl radicals, e.g., 1,3-dimethyl, 1,4-dimethyl, 2,7-dimethyl, 1,3-diethyl, 2,7-di(tert-butyl), 2-ethyl-6-(tert-butyl) and the corresponding 5,6,7,8-tetrahydro derivatives.

Particularly preferred alkylanthraquinones are 2-ethyl, 2-amyl and 2-tert.butyl anthraquinones, used individually or in combinations.

The "working compound" (reactive compound), e.g., anthraquinone derivatives being preferred, is preferably used in conjunction with a solvent or solvent mixture, the working compound and solvent(s) comprising a "work solution".

It should be understood, however, that work solutions containing only a working compound, e.g., anthraquinone derivatives, are within the scope of the present invention. A solvent for the working compound(s) is preferred in the case of anthraquinone derivative working compounds but not essential for carrying out the oxidation reaction in the microreactor of this invention.

The solvent or solvent mixture used in the working solution preferably has a high partition coefficient for hydrogen peroxide with water, so that hydrogen peroxide can be efficiently extracted. Preferred solvents are chemically stable to the process conditions, insoluble or nearly insoluble in water, and a good solvent for the anthraquinone derivative, e.g., alkylanthraquinone, or other working compound employed, in both their oxidized and reduced forms. For safety reasons, the solvent preferably should have a high flash point, low volatility, and be nontoxic.

Mixed solvents may be used and are preferred for enhancing the solubility of the (anthraquinone) working compound in both its hydrogenated (reduced) form (i.e., the hydroquinone form) and its oxidized (neutral) form (i.e., the quinone form.) The organic solvent mixture, forming part of the working solution, is preferably a mixture of a nonpolar compound and of a polar compound.

Since polar solvents tend to be relatively soluble in water, the polar solvent is desirably used sparingly so that water extraction of the oxidized working solution does not result in contamination of the aqueous hydrogen peroxide product in the aqueous extract. Nevertheless, sufficient polar solvent must be used to permit the desired concentration of the anthrahydroquinone to be present in the working solution's organic phase. The maintenance of a proper balance between these two criticalities is important in peroxide manufacture but is well known to those skilled in the art.

Solvent mixtures generally contain one solvent component, often a non-polar solvent, in which the anthraquinone derivative is highly soluble, e.g., $C_8$ to $C_{17}$ ketones, anisole, benzene, xylene, trimethylbenzene, methylnaphthalene and the like, and a second solvent component, often a polar solvent, in which the anthrahydroquinone derivative is highly soluble, e.g., $C_5$ to $C_{12}$ alcohols, such as diisobutylcarbinol and heptyl alcohol, methylcyclohexanol acetate, phosphoric acid esters, such as trioctyl phosphate, and tetra-substituted or alkylated ureas.

As noted earlier, the inert solvent system typically comprises a suitable anthraquinone and anthrahydroquinone solvent.

The solvent or solvent component for the anthraquinone derivative, e.g., alkylanthraquinone, is preferably a water-immiscible solvent. Such solvents include aromatic crude oil distillates having boiling points within the range of range of from 100° C. to 250° C., preferably with boiling points more than 140° C. Examples of suitable anthraquinone solvents are aromatic $C_9$-$C_{11}$ hydrocarbon solvents that are commercial crude oil distillates, such as Shellsol (Shell Chemical LP, Houston, Tex., USA), SureSol™ 150ND (Flint Hills Resources, Corpus Christi, Tex., USA), Aromatic 150 Fluid or Solvesso™ (ExxonMobil Chemical Co., Houston Tex., USA), durene (1,2,4,5-tetramethylbenzene), and isodurene (1,2,3,5-tetramethylbenzene).

Examples of suitable anthrahydroquinone solvents include alkylated ureas, e.g., tetrabutylurea, cyclic urea derivatives, and organic phosphates, e.g., 2-ethylhexyl phosphate, tributyl phosphate, and trioctyl phosphate. In addition, suitable anthrahydroquinone solvents include carboxylic acid esters, e.g., methyl cyclohexyl acetate (marketed under the name Sextate), and $C_4$-$C_{12}$ alcohols, e.g., including aliphatic alcohols such as 2-ethylhexanol and diisobutyl carbinol, and cyclic amides and alkyl carbamates.

Alternatively, where all quinone systems are employed or other non-anthraquinone based auto-oxidation systems are employed in the method of this invention, the working compound may be employed without the use of a solvent.

Non-Anthraquinone Systems

The microreactor-based oxidation step of the present invention is applicable to auto-oxidation production of hydrogen peroxide using working compounds other than anthraquinones. The oxidation in a microreactor may be carried out using non-anthraquinone working compounds conventionally used in large-scale auto-oxidation production of hydrogen peroxide.

One example of such working compounds is azobenzene (and its derivatives), which can be used in a cyclic auto-oxidation process in which hydrazobenzene (1,2-diphenylhydrazine) is oxidized with oxygen to yield azobenzene (phenyldiazenylbenzene) and hydrogen peroxide, the azobenzene then being reduced with hydrogen to regenerate the hydrazobenzene. U.S. Pat. No. 2,035,101 discloses an improvement in the azobenzene hydrogen peroxide process, using amino-substituted aromatic hydrazo compounds, e.g., amino-substituted benzene, toluene, xylene or naphthalene.

Another example of such working compounds is phenazine (and its alpha-alkylated derivatives, e.g., methyl-1-phenazine), which also can be used in a cyclic auto-oxidation process in which dihydrophenazine is oxidized with oxygen to yield phenazine and hydrogen peroxide, the phenazine then being reduced, e.g., with hydrogen, to regenerate the dihydrophenazine. The phenazine hydrogen peroxide process is disclosed in U.S. Pat. No. 2,862,794.

The microreactor oxidation method of this invention is also applicable to working compounds used in non-cyclic auto-oxidation hydrogen peroxide processes, which typically involve oxidation of a working compound without an initial reduction of hydrogenation step. Such working compounds include isopropanol or other primary or secondary alkyl alcohols or aryl alcohols, which may be oxidized to an aldehyde or ketone, to yield hydrogen peroxide.

Oxidation—Auto-oxidation and Optional Oxidation Catalyst

The oxidation step of this invention is carried out in a microreactor The hydrogenated working solution that is obtained from hydrogenation of the working compound is subjected to oxidation in a microreactor, with a suitable oxidizing agent, to produce the desired product, hydrogen peroxide.

The oxidation step preferably carried out in the microreactor as an auto-oxidation reaction. In other words, the oxidation reaction of the hydrogenated working compound (with oxygen or an oxygen-containing gas) in the microreactor is effected without the presence of a catalyst under suitable operating conditions. The method of this invention does not preclude the use of a catalyst during oxidation, but such a catalyst is merely optional.

The oxidizing agent is normally air, oxygen, oxygen-rich gas or other oxygen-containing gas or other suitable oxygen-containing source. "Oxygen-rich" gas refers to any suitable gas containing at least 50 vol % oxygen.

As noted above, the oxidation method of the present invention may optionally be carried out using a catalyst, any material capable of catalyzing or otherwise facilitating the oxidation reaction between a suitable working compound and oxygen (or an oxygen-containing gas). Suitable catalysts include oxidation catalysts used in conventional large-scale oxidation steps in known AO hydrogen peroxide manufacturing methods. Such oxidation catalysts, unlike metal solid or supported metal hydrogenation catalysts, are normally dissolved or otherwise incorporated into the working solution, along with the working compound. The preferred optional oxidation catalysts are dissolved in the solvent-based working solution.

Examples of the optional oxidation catalysts include secondary or tertiary amines. Preferred secondary and tertiary amines are those that are only slightly water-soluble (so as not to be removed in the aqueous hydrogen peroxide extract). Preferred secondary amines that are substantially water-insoluble are those having at least 8 and in particular 12 to 36 carbon atoms and including aliphatic, cycloaliphatic, aromatic and aromatic-aliphatic amines. Preferred tertiary amines are those having a pKa value of greater than 9.

Examples of aliphatic secondary amines are di-n-butylamine, di-n-hexylamine, n-octylamine, N-isopropyl-n-dodecyl aamine, N-ethylhexadecylamine, N-di-n-octylamine, di-n-dodecylamine, N-methyl-n-hexylamine, N-ethyl-ethylstearylamine,distearylamine, dibenzylamine, N-butylbenzylamine. Examples of aliphatic-aromatic secondary amines are N-methylaniline, N-ethylaniline, Nisopropylaniline, N-benzylaniline, N-n-propylaniline, N-i-butylaniline, N-n-hexylaniline, N-methyl-ortho-, -meta-or -paratoluidine, N-isoamyl-toluidine, N-n-butylxylidine, N-octylnaphthalene. Aromatic secondary amines include, e.g., diphenylamine, ditolylamine and di-2-naphthylamine In addition, the optional oxidation catalysts maybe an alkaline-reacting, ionizable water-soluble inorganic compound such as alkali metal hydroxides, alkaline earth hydroxides, sodium carbonate, sodium hydroxide and ammonium hydroxide.

The concentration of the oxidation catalyst can vary widely, ranging from 1 ppm to 50 wt % or more, such weights based on the weight of the working compound. Preferably, the concentration of the oxidation catalyst when a secondary or tertiary amine is used is about 1 to about 30 wt %, and more preferably, 2 to 20 wt. %, in each case based on the working solution.

Hydrogen Peroxide Recovery & Regeneration of Working Solution

The working compound, e.g., anthraquinone derivative, is regenerated or reformed during the oxidation step and, in cyclic processes, is recycled to the hydrogenation stage after recovery of the hydrogen peroxide product from the oxidized working solution.

In the cyclic anthraquinone process, the anthraquinone working compound, reduced to the corresponding anthrahydroquinone (hydroquinone form) during hydrogenation, is converted back to the original anthraquinone (quinone form) in the auto-oxidation step, with the concurrent production of hydrogen peroxide as an oxidation product. The reformed working compound is normally recycled back to the hydrogenation step, for reuse, after recovery of the hydrogen peroxide product.

Recovery of the resulting hydrogen peroxide produced in the microreactor oxidation step is normally carried out via water extraction of the working solution effluent stream from the oxidation microreactor. Conventional extraction techniques and equipment may be used for the hydrogen peroxide recovery, and these techniques are well-known to those skilled in the art. Other hydrogen peroxide recovery techniques are also possible, for separating the hydrogen peroxide from the working solution, but water extraction is preferred.

One embodiment of the invention includes the presence of water during the oxidation, preferably as a mixture of working solution and water. At least a portion of the hydrogen peroxide produced during the oxidation is then distributed into the water (aqueous phase).

The recovered hydrogen peroxide product, in the aqueous extract, may be concentrated, as desired, using concentration techniques and equipment conventionally used in the production of concentrated forms of hydrogen peroxide. In addition, various stabilizers may be added to the recovered product, to minimize hydrogen peroxide decomposition, s is well known in the art.

The following non-limiting Examples illustrate various aspects of the present invention.

EXAMPLES

Experimental Procedure for Examples 1-17

The hydrogen peroxide methods illustrated in these Examples 1-17 employed an auto-oxidation process using various anthraquinone derivative working solutions and operating conditions. The oxidation stage of the auto-oxidation hydrogen peroxide process of this invention was carried out in a microreactor, using hydrogenated working solutions.

The oxidation microreactor employed in Examples 1-17 was made of stainless steel grade SS316L and had a tubular microchannel with a diameter of 0.775 mm and a linear (straight) longitudinal configuration, 8 cm in length. The oxidation microreactor contained a packing of glass beads. No catalyst was present in the oxidation microreactor, so the oxidation of the hydrogenated working solution with air or oxygen gas was via auto-oxidation.

The working solution for Examples 1-10 was a solvent mixture of aromatic $C_9$-$C_{11}$, hydrocarbon solvent, trioctyl phosphate, and akylated urea, with the working compounds (reaction carrier) being 2-ethylanthraquinone and 2-ethyltetrahydroanthraquinone. In preparation for the oxidation step in these Examples, the working solution was first hydrogenated with hydrogen gas to yield a hydrogenated working solution, containing a specific, constant level of equivalent hydrogen peroxide that was used for each of the Examples.

Examples 11-17 illustrate other anthraquinone derivative working solutions, with various solvents and reactive carriers, as described below.

The oxidizing agent used in the oxidation microreactor was compressed pure oxygen gas or air that flowed through a mass flow controller. The air or oxygen gas stream was then mixed with the working solution in a T fitting and fed to the oxidation microreactor inlet.

A constant temperature oil bath was used to maintain the microreactor at the desired temperature. The inlet and outlet pressures of the reactor were also measured. The reaction mixture (oxidized work solution) that exited from the microreactor outlet was diluted with a high flow of nitrogen gas and passed through a backpressure regulator that was used to maintain the desired pressure throughout the run.

The oxidized work solution effluent exiting from the hydrogenation microreactor outlet was collected in a product receiver, which was blanketed with pure $N_2$ gas to preclude further oxidation of the working solution, and then was subsequently analyzed to determine its hydrogen peroxide content.

The hydrogen peroxide product produced via auto-oxidation of the hydrogenated work solution in the oxidation microreactor was first extracted for the oxidized working solution with aqueous 15% $H_2SO_4$. The aqueous extract was then titrated with potassium permanganate ($KMnO_4$), to determine equivalent hydrogen peroxide and calculate the percentage oxidation conversion obtained in the auto-oxidation.

Preparation for a run involved first pumping the hydrogenated working solution, having a specific level of equivalent hydrogen peroxide, through the microreactor system to obtain the desired flow rate. The backpressure regulator was adjusted to obtain the desired reactor outlet pressure. At the start of a run, air or pure oxygen gas was then introduced into the work solution, and the mixture was passed through the microreactor system in a controlled manner using the mass flow controller.

Examples 1-10

Examples 1-3 were carried out using air as the oxidizing agent in the oxidation microreactor, and Examples 4-10 were carried out using pure oxygen gas as the oxidizing agent.

In Examples 1-3 with air as the oxidizing agent, operating temperature was varied (40° C., 55° C., 70° C.) and the microreactor outlet pressure was varied (30 psig (60 psig inlet), 50 psig, 70 psig).

Examples 4-10 used oxygen as the oxidizing agent and studied the effects of varying the operating temperature (25° C., 50° C., 60° C., 70° C.), microreactor outlet pressure (50 psig, 70 psig, 100 psig, 120 psig) and oxygen gas flow rate (7.5 sccm, 10 sccm, 12.5 sccm).

In each of Examples 1-10 the other operating parameters were kept constant, i.e., working solution composition and working solution flow rate of 0.4 ml/min.

Results and operating parameters for Examples 1-10 are shown in Table 1.

The hydrogen peroxide product, as g $H_2O_2$/liter (of aqueous extract), was determined for each of the Examples. In addition, reactor productivity, measured as kg $H_2O_2$/hr per cubic meter of reactor volume (based on unpacked microreactor channel volume), and oxidation conversion, measured as a percentage of the equivalent hydrogen peroxide present in the hydrogenated working solution fed to the oxidation microreactor, were also determined for each of the Examples.

anthraquinones) and working solvents, as hydrogenated anthraquinone work solutions that are subjected to auto-oxidation with pure oxygen gas ($O_2$) to produce hydrogen peroxide.

Examples 11-17 were carried out in the same oxidation microreactor that was used in Examples 1-10, under the general operating procedures described above. The specific operating conditions were identical to those used in Example 6: The operating temperature of the oxidation microreactor was 70° C., the oxygen gas ($O_2$) was introduced into the microreactor at a flow rate of 10 sccm, the hydrogenated work solution was flowed through the microreactor at a rate of 0.3 ml/min., and the work solution effluent outlet pressure was 50 psig, in each of the seven Examples.

Example 11 used a hydrogenated working solution that contained hydroquinones of 2-ethylanthraquinone and of 2-ethyltetraanthrahydraquinone and their unhydrogenated parent quinone compounds as the working compounds, in a solvent mixture containing a non-polar solvent and a polar solvent, respectively, aromatic $C_9$-$C_{11}$ hydrocarbon solvent and methylcyclohexyl acetate.

Example 12 used a hydrogenated working solution that contained hydroquinones of 2-ethylanthraquinone, 2-ethyltetrahydroanthraquinone and 2-tertiarybutylanthraquinone and their unhydrogenated parent quinone compounds as the working compounds, in a solvent mixture containing aromatic $C_9$-$C_{11}$ hydrocarbon solvent and methylcyclohexyl acetate.

Example 13 used a hydrogenated working solution that contained hydroquinones of 2-ethylanthraquinone and 2-ethyltetrahydroanthraquinone and their unhydrogenated parent quinone compounds as the working compounds (the same as in Example 11), but the solvent mixture in Example 13 contained aromatic $C_9$-$C_{11}$ hydrocarbon solvent, and three polar solvents, methylcyclohexyl acetate, trioctyl phosphate and alkylated urea.

Example 14 used a hydrogenated working solution that contained hydroquinones of 2-ethylanthraquinone, 2-ethyltetrahydroanthraquinone and 2-amylanthraquinone and their unhydrogenated parent quinone compounds as the

TABLE 1

| Example No. | Temperature (° C.) | Outlet Pressure (psig) | Type of Gas | $O_2$ Flow (sccm) | Hydrogenated Work Solution Flow (ml/min) | $H_2O_2$ Equivalent (g/L) | Oxidation Conversion (%) | Reactor Productivity (kg $H_2O_2$/hr-m³) |
|---|---|---|---|---|---|---|---|---|
| 1 | 40 | 30 | Air | 15 | 0.3 | 1.3 | 15.3 | 592 |
| 2 | 55 | 50 | Air | 15 | 0.3 | 1.4 | 17.3 | 668 |
| 3 | 70 | 70 | Air | 15 | 0.3 | 2.5 | 30.6 | 1183 |
| 4 | 50 | 100 | $O_2$ | 10 | 0.3 | 6.7 | 67.4 | 3205 |
| 5 | 60 | 100 | $O_2$ | 10 | 0.3 | 7.6 | 76.1 | 3622 |
| 6 | 70 | 50 | $O_2$ | 10 | 0.3 | 8.6 | 86.3 | 4107 |
| 7 | 70 | 120 | $O_2$ | 7.5 | 0.3 | 3.3 | 33.1 | 1576 |
| 8 | 70 | 120 | $O_2$ | 10 | 0.3 | 9.1 | 91.0 | 4331 |
| 9 | 70 | 120 | $O_2$ | 12.5 | 0.3 | 9.4 | 94.0 | 4470 |
| 10 | 25 | 70 | $O_2$ | 12.5 | 0.3 | 6.21 | 62.2 | 2960 |

Examples 11-17

Examples 11-17 demonstrate the oxidation microreactor used with various conventional hydrogenated anthraquinone derivative working compounds (hydrogenated alkylated working compounds, in a solvent mixture containing aromatic $C_9$-$C_{11}$ hydrocarbon solvent, trioctyl phosphate and alkylated urea.

Example 15 used a hydrogenated working solution that contained the hydroquinone of 2-ethylanthraquinone as the working compound, in a solvent mixture containing aromatic $C_9$-$C_{11}$ hydrocarbon solvent and methylcyclohexyl acetate.

Example 16 used a hydrogenated working solution that contained hydroquinones of 2-amylanthraquinone and 2-amyltetrahydroanthraquinone and their unhydrogenated parent quinone compounds as the working compounds, in a solvent mixture containing a non-polar solvent and a polar solvent, respectively, aromatic $C_9$-$C_{11}$ hydrocarbon solvent and 2,6-dimethyl-4-heptanol (diisobutylcarbinol—DIBC).

Example 17 used a hydrogenated working solution that contained hydroquinones of 2-ethylanthraquinone and 2-ethyltetrahydroanthraquinone and their unhydrogenated parent quinone compounds as the working compounds, in a solvent mixture containing aromatic $C_9$-$C_{11}$ hydrocarbon solvent, trioctyl phosphate and alkylated urea.

Results and operating parameters for Examples 11-17 are shown in Table 2.

The hydrogen peroxide product, as g $H_2O_2$/liter, was determined for each of the Examples. In addition, reactor productivity, measured as kg $H_2O_2$/hr per cubic meter of reactor volume (based on unpacked microreactor channel volume), and oxidation conversion, measured as a percentage of the equivalent hydrogen peroxide present in the hydrogenated working solution fed to the oxidation microreactor, were also determined for each of the Examples.

The reactor productivity demonstrated in the microreactor oxidation of Examples 1-17 (see last column in Tables 1 & 2) is greatly improved over reactor productivities reported in the prior art, for conventional oxidation reactor operations. U.S. Pat. No. 5,196,179 discloses reactor productivity for a prior art oxidation reactor and its inventive oxidation reactor in the Example, being 15 kg $H_2O_2$/hr-$m^3$ using air as the oxidant and 254 kg $H_2O_2$/hr-$m^3$ using oxygen as the oxidant, respectively.

By contrast, Examples 1-17 illustrating the oxidation microreactor of the present invention yielded far superior reactor productivity yields, ranging from 592-1183 kg $H_2O_2$/hr-$m^3$ using air as the oxidizing agent in Examples 1-3 (see Table 1, last column), and ranging from 1576-5266 kg $H_2O_2$/hr-$m^3$ using oxygen as the oxidizing agent in Examples 4-17 (see Tables 1 & 2, last column).

through the microchannel reactor at a temperature of 80° C. The microreactor was maintained at about 150 psig outlet pressure.

The reaction mixture that exited from the microreactor was analyzed for $H_2O_2$ using an Ampule color comparator titration testing kit available from CHEMetrics, Inc. (4295 Catlett Road, Calverton, Va. 22016 USA). Multiple samples of the reaction mixture were analyzed, to confirm that the hydrogen peroxide produced in the reaction mixture was about 1.35 g/L of $H_2O_2$.

What is claimed is:

1. A method for the production of hydrogen peroxide comprising effecting oxidation of a working compound in a microreactor to produce hydrogen peroxide and recovering the hydrogen peroxide.

2. A cyclic method for the production of hydrogen peroxide comprising the steps of
   catalytically hydrogenating a working compound to yield a hydrogenated working compound;
   oxidizing the hydrogenated working compound in an oxidation microreactor, to produce hydrogen peroxide;
   separating the resulting hydrogen peroxide from the oxidized working compound and recovering the hydrogen peroxide in an aqueous solution; and
   recycling the oxidized working compound to the hydrogenation step.

3. The method of claim 1 wherein the working compound is selected from the group consisting of amino-substituted aromatic hydrazo compounds, dihydrophenazine, alkylated dihydrophenazine derivatives, alkyl anthrahydroquinones, hydroalkyl anthrahydroquinones, mixtures of alkyl anthrahydroquinones and hydroalkyl anthrahydroquinones, and primary and secondary alkyl alcohols and aryl alcohols.

4. The method of claim 2 wherein the working compound is selected from the group consisting of amino-substituted aromatic azo compounds, phenazine, alkylated phenazine derivatives, alkyl anthraquinones and hydroalkyl anthraquinones and mixtures of alkyl anthraquinones and hydroalkyl anthraquinones.

TABLE 2

| Example No. | Temperature (° C.) | Outlet Pressure (psig) | Type of Gas | $O_2$ Flow (sccm) | Hydrogenated Work Solution Flow (ml/min) | $H_2O_2$ Equivalent (g/L) | Oxidation Conversion (%) | Reactor Productivity (kg $H_2O_2$/hr-$m^3$) |
|---|---|---|---|---|---|---|---|---|
| 11 | 70 | 50 | $O_2$ | 10 | 0.3 | 11.0 | 93.6 | 5266 |
| 12 | 70 | 50 | $O_2$ | 10 | 0.3 | 9.6 | 87.0 | 4571 |
| 13 | 70 | 50 | $O_2$ | 10 | 0.3 | 8.9 | 88.2 | 4240 |
| 14 | 70 | 50 | $O_2$ | 10 | 0.3 | 10.7 | 89.1 | 5119 |
| 15 | 70 | 50 | $O_2$ | 10 | 0.3 | 4.0 | 84.8 | 1932 |
| 16 | 70 | 50 | $O_2$ | 10 | 0.3 | 12.4 | 74.1 | 5935 |
| 17 | 70 | 50 | $O_2$ | 10 | 0.3 | 10.7 | 82.7 | 5114 |

Example 18

A different method for the preparation of $H_2O_2$ was utilized in this Example 18, based on the auto-oxidation of 2-propanol, instead of the anthraquinone systems used in the previous examples. In this Example 18, the feed stream introduced to the microreactor consisted of ultra pure oxygen and 2-propanol. A gas stream of oxygen (6 sccm) was mixed with 2-propanol (0.4 ml/min), and this feed stream was passed 5. The method of claim 1 or 2 wherein the oxidation uses an oxidizing agent selected from the group consisting of air, oxygen and oxygen-rich gas.

6. The method of claim 1 or 2 wherein the microreactor contains one or more microchannels, in which the oxidation is carried out.

7. The method of claim 6 wherein the microchannel has at least one cross sectional dimension within the range of from 1 micron to 5 mm.

8. The method of claim 6 wherein the microchannel has at least one cross sectional dimension within the range of from 5 microns to 2 mm.

9. The method of claim 6 wherein the microchannel has at least one cross sectional dimension within the range of from 5 microns to 1 mm.

10. The method of claim 6 wherein the oxidation microreactor contains an inlet to one or more linked microchannels and an outlet from such microchannels, for respectively introducing the working compound to the microreactor and removing oxidized working compound from the microreactor.

11. The method of claim 6 wherein the microreactor further contain at least one additional passageway adjacent to at least one oxidation microchannel for effecting heat transfer and oxidation temperature control using a heat transfer fluid during the oxidation reaction.

12. The method of claim 6 wherein the microreactor comprises layered sheets that contain an interconnected microchannel network.

13. The method of claim 1 or 2 wherein the working compound is carried in an organic solvent.

14. The method of claim 13 wherein the working compound is selected from the group consisting of alkyl anthraquinones and hydroalkyl anthraquinones and mixtures of alkyl anthraquinones and hydroalkyl anthraquinones and the working compound is carried in a solvent mixture of (i) an aromatic $C_9$-$C_{11}$ hydrocarbon solvent and (ii) a second solvent component selected from the group consisting of alkylated ureas, cyclic urea derivatives, organic phosphates, carboxylic acid esters, $C_4$-$C_{12}$ alcohols, cyclic amides and alkyl carbamates and mixtures thereof.

15. The method of claim 13 wherein the oxidation of the working compound in an organic solvent is also carried out in the presence of water.

16. The method of claim 1 or 2 wherein the oxidation is facilitated by an oxidation catalyst, used in combination with the working compound.

17. The method of claim 16 wherein the catalyst is selected from the group consisting of secondary and tertiary amines, alkali metal hydroxides, alkaline earth hydroxides, sodium carbonate, sodium hydroxide and ammonium hydroxide.

18. The method of claim 1 or 2 wherein the oxidation is carried out at temperatures within the range of about 20° C. to about 100° C.

19. The method of claim 1 or 2 wherein the oxidation is carried out at a pressure in the range of about 5 psig to about 300 psig.

20. The method of claim 19 wherein the oxidation is carried out at a pressure of less than about 150 psig.

21. The method of claim 1 wherein the hydrogen peroxide is separated from the oxidized working compound by extraction with water, to produce an aqueous extract containing hydrogen peroxide.

22. A cyclic method for the production of hydrogen peroxide comprising the steps of catalytically hydrogenating an anthraquinone working solution, comprising an anthraquinone derivative carried in an organic solvent, to yield a hydrogenated working solution;

oxidizing the hydrogenated working solution in an oxidation microreactor, to produce hydrogen peroxide;

separating the hydrogen peroxide from the working solution via aqueous extraction and recovering an aqueous solution of hydrogen peroxide; and recycling the working solution to the hydrogenation step.

* * * * *